UNITED STATES PATENT OFFICE.

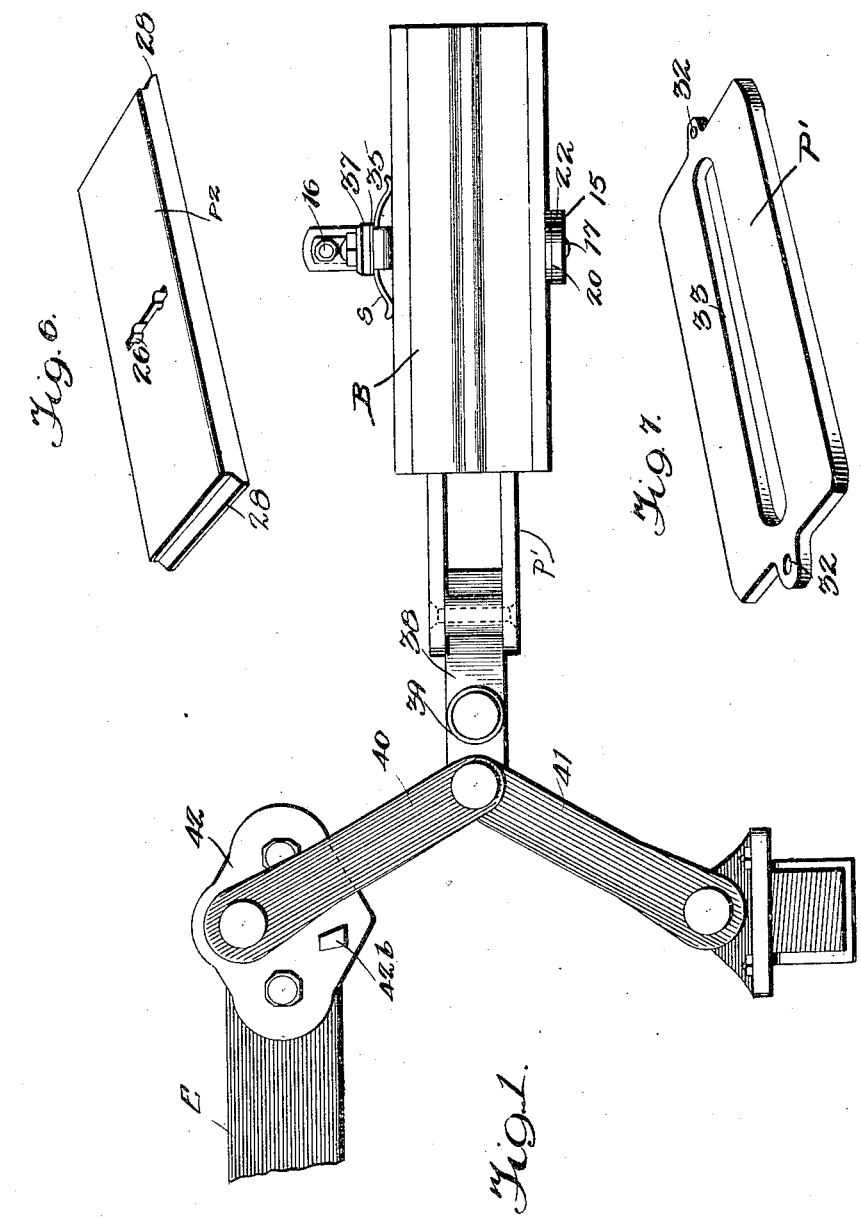

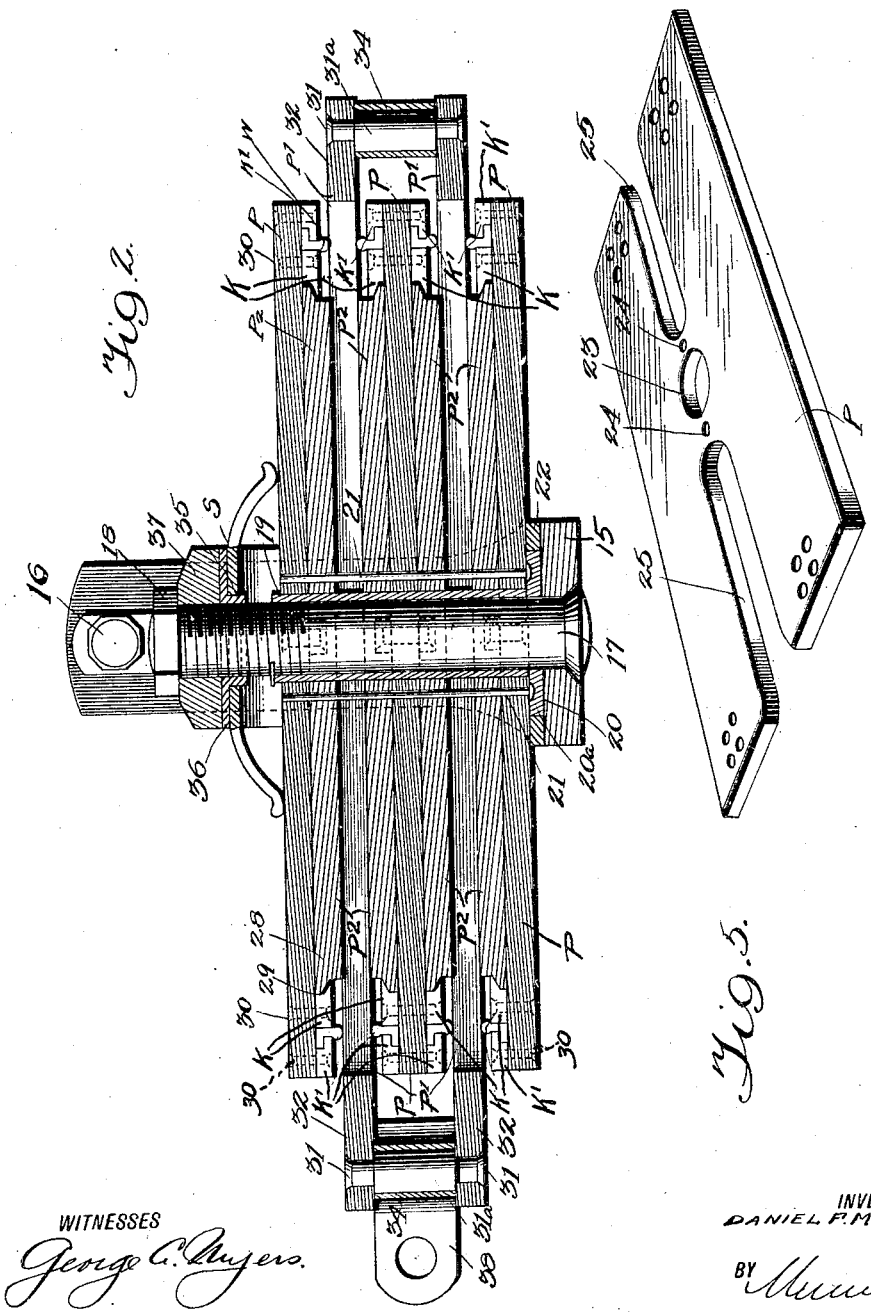

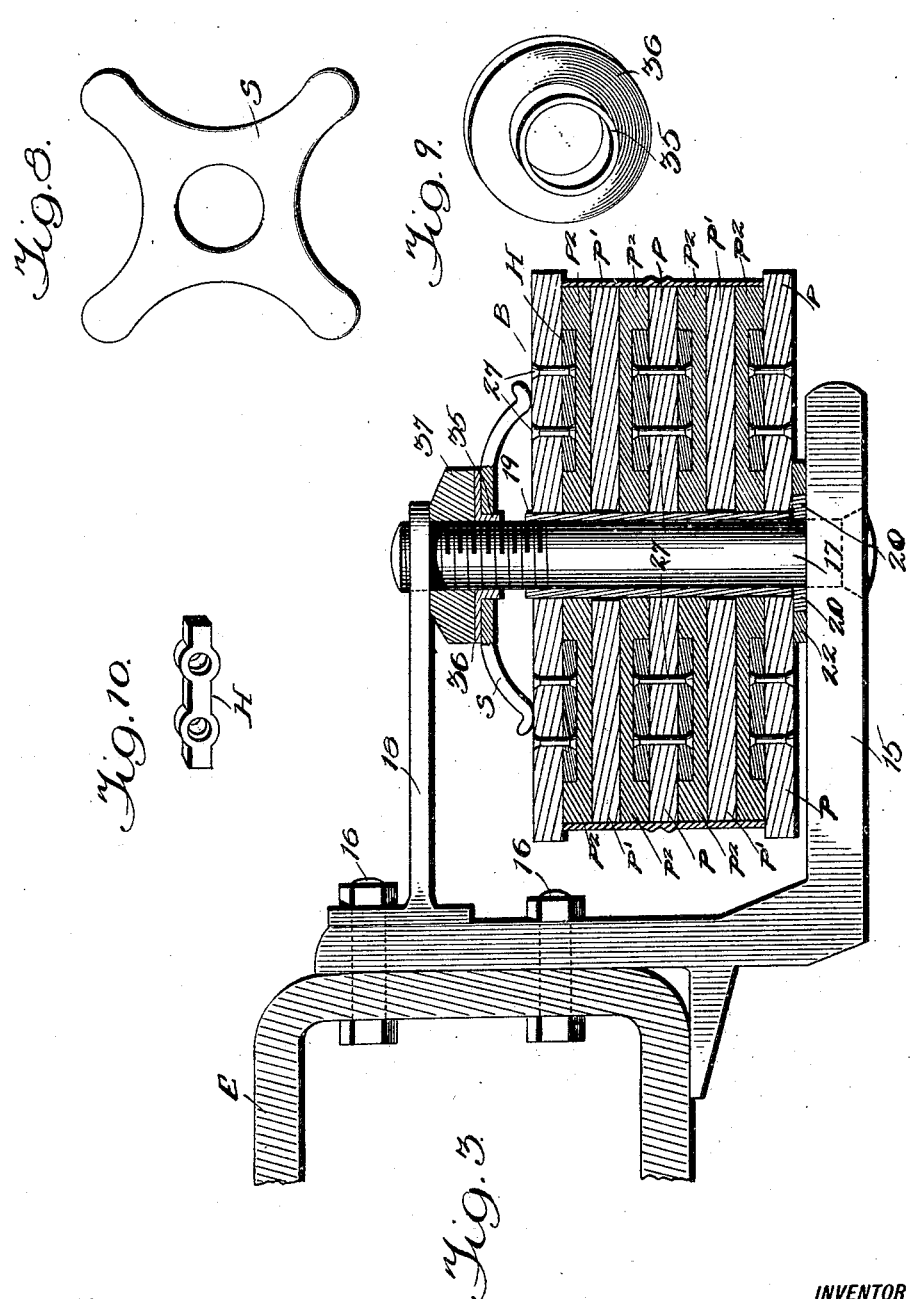

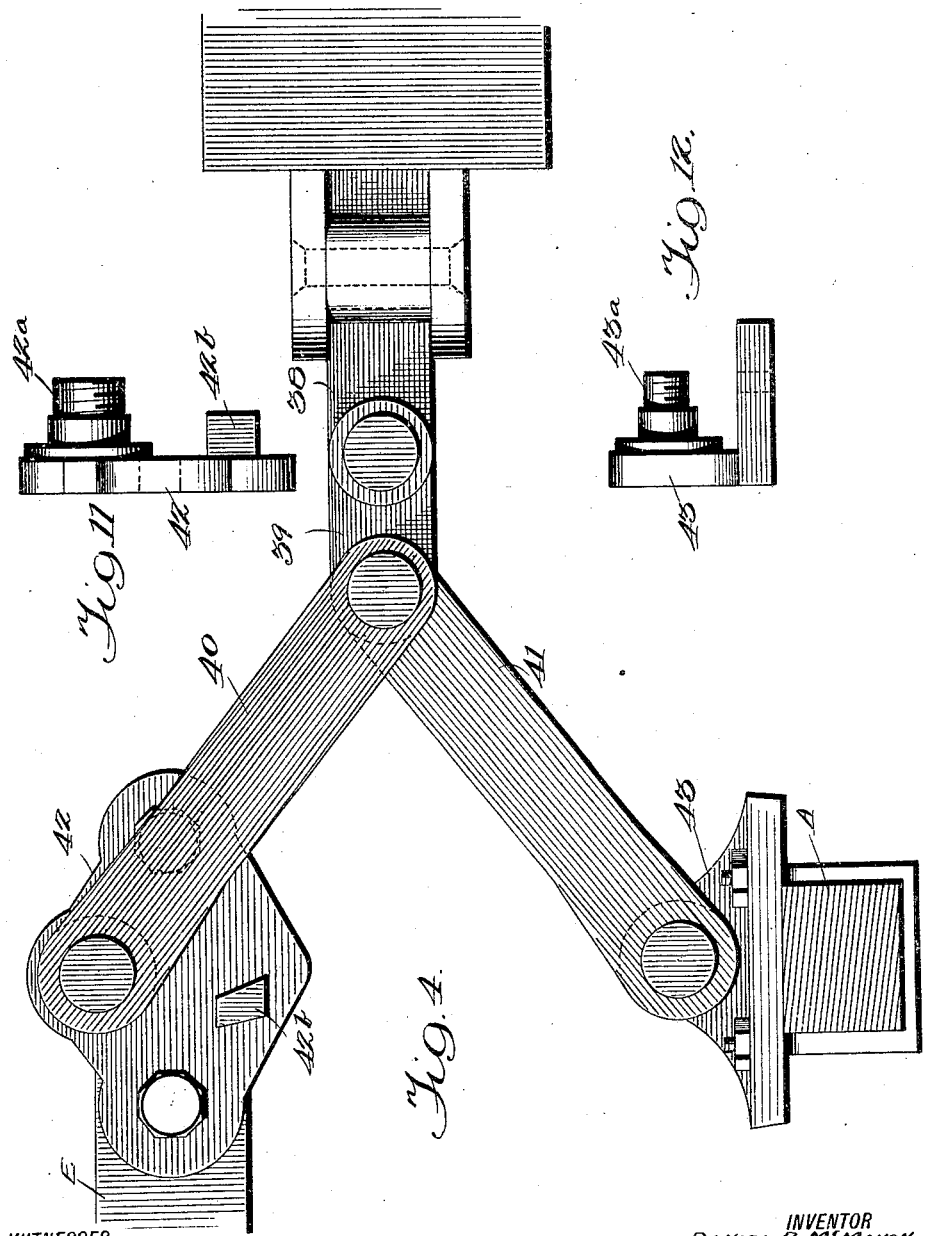

DANIEL FRANCIS McMAHON, OF CICERO, ILLINOIS.

SHOCK ABSORBER.

1,410,940.   Specification of Letters Patent.   Patented Mar. 28, 1922.

Application filed November 10, 1919. Serial No. 336,867.

*To all whom it may concern:*

Be it known that I, DANIEL F. MCMAHON, a subject of the King of Great Britain, and a resident of Cicero, in the county of Cook and State of Illinois, have invented certain new and useful Improvements in Shock Absorbers, of which the following is a specification.

My invention relates to shock absorbers, and particularly to devices for absorbing the shocks to which the body of a motor vehicle is subjected, although it is to be understood that the invention is not limited to this particular adaptation.

It is a purpose of my invention to provide a shock absorber of the frictional type wherein a set of movable plates is associated with a set of stationary plates, one of the sets being formed with friction surfaces to provide the required friction between the sets of plates to effect a control of the movement of the body of the vehicle with relation to the chassis.

It is also a purpose of my invention to provide means for varying the frictional contact between the sets of plates and for guiding the movable plates during movement and maintaining the stationary plates in predetermined positions.

I will describe one form of shock absorber embodying my invention, and will then point out the novel features thereof in claims.

In the accompanying drawings:

Figure 1 is a view, showing in side elevation one form of shock absorber embodying my invention;

Figure 2 is a longitudinal sectional view of the body of the shock absorber shown in Figure 1;

Figure 3 is a transverse sectional view of the body of the shock absorber shown in Figure 1;

Figure 4 is an enlarged detail view, showing in side elevation one manner of connecting the shock absorber to the chassis and body of the vehicle; and Figures 5 to 12, inclusive, are detail views of the shock absorber shown in the preceding views.

Similar references characters refer to similar parts in each of the several views.

Referring specifically to the drawings, and particularly to Figures 1, 2 and 3, 15 designates an L-shaped casting which is bolted to the chassis E by means of bolts 16, such castings constituting a bracket for supporting the body of the shock absorber. As shown in Figures 2 and 3, 17 designates a bolt which extends through a horizontal arm of the bracket 15, and has its head partially embedded therein. The upper threaded end of the bolt is embraced by an arm 18 which is secured to the vertical portion of the brackets by one of the bolts 16. Surrounding the shank of the bolt 17 is a sleeve bushing 19, and interposed between the lower end of such bushing and the bracket 15 is a flat ring 20 formed on its upper surface with recesses 20ª to receive the heads of stays 21. Surrounding the ring 20 and resting upon the bracket 15 is a bushing 22.

The body B of the shock absorber in the present embodiment comprises a set of stationary plates P, a set of movable plates P', and a set of friction plates P² which are secured to the stationary plates and are interposed between the latter and the movable plates. As shown in Figure 5, each stationary plate is provided centrally thereof with a circular opening 23, the walls of which embrace the periphery of the sleeve bushing 19, and adjacent the opening 23 the plate is formed with smaller openings 24, through which the stays 21 are adapted to extend. By this arrangement it will be seen that the stationary plates P are free to slide vertically upon the sleeve bushing 21 but are locked against longitudinal movement with respect to the bolt 17. Referring again to Figure 5, the opposite ends of each plate P are recessed to provide slots 25 to accommodate the supporting rivets for the movable plate P' as will be hereinafter described.

In the present instance I have shown the body of the shock absorber provided with three stationary plates P arranged one above the other, as is clearly shown in Figures 2 and 3. Secured to the inner sides of the upper and lower plates P and to the opposite sides of the intermediate plate P are the friction plates P², such plates being preferably formed of wood or any other suitable fibrous material which provides friction surfaces so as to secure the proper friction between these plates and the movable plates P'. As shown in Figure 6, each plate P² is provided centrally thereof with a recessed portion 26 which constitutes a socket for receiving a head H secured to the stationary plate P by means of rivets 27, as clearly shown in Figure 3. The detail construction of each head H is clearly shown in Figure 10, wherein it will be noted it is provided with curved portions which are adapted to fit in correspondingly shaped recesses formed in the socket 26. The purpose of this arrangement is to lock the friction plates P² securely to the corresponding plate P so that the former will not move under the action of the movable plates P'. As shown in Figure 6, the opposite end edges of each plate P² are beveled to provide tongues 28, which are adapted to coact with tongues 29 formed on one longitudinal edge of securing bars K for forming an additional means for locking the friction plate to the corresponding stationary plate P. As illustrated to advantage in Figure 2, the securing bars K are arranged along the marginal edges of the stationary plates P and are secured thereto by means of rivets 30. Secured contiguous to the transverse edges of the stationary plates P also by rivets 30 and at one side of the securing bars K are bars K' which are so formed as to coact with the bars K to provide a clamp for the L-shaped shank of wipers W. As shown in Figure 2, the wipers W project beyond the surface of the bars K and K' and into the path of the movable plates P' so that they engage the surfaces of the latter and remove all foreign matter from the surfaces of the movable plates.

Referring again to Figure 2, the movable plates P' are shown interposed between adjacent pairs of friction plates P² and are connected at their ends for simultaneous movement by means of rivets 31 which extend through ears 32 formed on the transverse edges of such plates. As shown in Figure 7, each plate P' is formed along its longitudinal axis with a slot 33, which receives the bolt 17 and thereby allows unrestricted longitudinal movement of such plates. As shown in Figure 2, the rivets 31 are provided with enlarged intermediate portions 31ª which provide shoulders for supporting the ears 32 to maintain the plates P' in spaced parallel relation at all times. The sleeve bushing 34 surrounds the enlarged intermediate portion 31ª in the manner shown. For causing the friction plates P² to engage the surface of the movable plates P' with the necessary amount of friction in order that the movement of the movable plates may be properly controlled, I provide a spring S such as shown in detail in Figure 8. As shown in Figures 2 and 3, the spring S embraces the upper end of the bolt 17, its four fingers extending downwardly and bearing against the upper side of the upper plate P. In order to permit vertical adjustment of the spring S, a collar 35 is interposed between the spring and bolt, such collar being formed on a washer 36 interposed between the spring and a nut 37. From this arrangement it will be seen that by rotating the nut in one direction or the other, the spring S will be moved downwardly to increase the pressure of the abrasive plates P² upon the movable plates P' or moved upwardly to relieve such pressure, thus it will be seen that the pressure exerted upon the stationary plates P is determined solely by the adjustment of the nut 37 and that as the pressure is increased or decreased, the friction between the friction plates P² and the movable plates P' is increased or decreased accordingly.

Referring now to Figures 1 and 4, 38 designates a collar which embraces the bushing 34 of the rivet 31 disposed in the left-hand end of the plates P', as when viewed in Figure 2. The collar 38 is connected to a relatively short link 39, which latter in turn is pivotally connected to the ends of a pair of links 40 and 41. The opposite ends of the links 40 and 41 are pivotally connected to plates 42 and 43, respectively, the latter being secured to the chassis E and axle A, respectively. As shown in Figure 11, the plate 42 is formed with a threaded extension 42ª to which the end of the link 40 is connected. The plate 42 is also formed with a lug 42ᵇ which constitutes a stop for limiting the movement of the link 40 in one direction. As shown in Figure 12, the plate 43 is likewise provided with a threaded extension 43ª to which the lower end of the link 41 is connected.

The normal positions of the links 40 and 41 is shown in Figure 4 and in this position the movable plate P' occupies the position of Figure 2. As the links 40 and 41 are connected to the axle and chassis, it will be seen that upon movement of the axle upwardly or downwardly with respect to the chassis, the links will be moved toward or away from each other so as to effect a movement of the plates P' in one direction or the other with relation to the stationary plates P.

From the foregoing description, taken in conjunction with the accompanying drawings, the operation of the shock absorber will be readily understood as follows:

As the movable plates P' are moved horizontally between the abrasive plates P² under the action of the links 40 and 41, the surface of the movable plates contact with the surfaces of the friction plates P², and because the surface of the plates P² are roughened, it will be obvious that great friction is created between the surfaces of the two plates thus retarding the movement of the movable plates. Should the surfaces of the plates P' or P² become worn after repeated use so that the proper frictional contact is destroyed, it is obvious that by adjusting the nut 37 the spring S will be caused to move the plates P² into closer contact with the plates P' so that the proper friction is again restored. As the movable plates P' reciprocate under the action of the links 40 and 41, the wipers W, which may be formed of any suitable material such as leather or the like, engage the opposite sides of the plates P' and thereby maintain the same clean at all times. It has been found in practice, that the frictional contact between the plates P' and P² generates a small amount of heat but that such heat never becomes excessive and detrimental because a portion of the movable plates P' are at all times exposed. These exposed portions permit radiation of the heat with a consequent cooling of the plates.

Although I have herein shown and described only one form of shock absorber embodying my invention, it is to be understood that various changes and modifications may be made herein without departing from the spirit of the invention or the spirit and scope of the appended claims.

Having thus described my invention, I claim:

1. A shock absorber comprising stationary plates, friction plates, a securing bar carried by the stationary plates and engageable with the friction plates for securing the latter to the former, heads carried by the stationary plates, sockets formed in the friction plates and receiving said heads, and interconnected movable plates interposed between adjacent friction plates.

2. A shock absorber comprising, stationary plates, friction plates, securing bars secured to the stationary plates, tongues formed on the bars and on the friction plates adapted to engage each other for locking the friction plates to the stationary plates, heads carried by the stationary plates, sockets formed in the friction plates and receiving said heads, a bolt extending through and loosely fitted in all of said plates, and movable plates interposed between the friction plates and having slots formed therein to receive said bolt.

3. A shock absorber comprising, stationary plates, friction plates, securing bars secured to the stationary plates, tongues formed on the securing bars and on the friction plates and coacting with each other to retain the friction plates on the stationary plates, a bolt extending through and loosely fitted in all of the plates, movable plates interposed between the friction plates and slotted to receive said bolt, wipers engageable with the surfaces of the movable plates, and other securing bars secured to the stationary plates and shaped to coact with the first securing bars to provide sockets for receiving and securing said wipers in proper position with respect to the movable plates.

DANIEL FRANCIS McMAHON.